May 1, 1951 K. H. ANDREN 2,551,358

TERMINAL WIRING APPARATUS

Original Filed Dec. 19, 1942 12 Sheets-Sheet 1

INVENTOR.
BY Karl H. Andren
Lieber & Lieber
ATTORNEYS.

TERMINAL WIRING APPARATUS

Original Filed Dec. 19, 1942 12 Sheets-Sheet 2

INVENTOR.
Karl H. Andren
BY Lieber & Lieber
ATTORNEYS.

May 1, 1951 K. H. ANDREN 2,551,358

TERMINAL WIRING APPARATUS

Original Filed Dec. 19, 1942 12 Sheets-Sheet 3

INVENTOR.
Karl H. Andren
BY
Liebert & Lieber
ATTORNEYS

May 1, 1951

K. H. ANDREN 2,551,358

TERMINAL WIRING APPARATUS

Original Filed Dec. 19, 1942

12 Sheets-Sheet 4

INVENTOR:
Karl H. Andren
BY Lieber & Lieber
ATTORNEYS

TERMINAL WIRING APPARATUS

Original Filed Dec. 19, 1942 12 Sheets-Sheet 5

INVENTOR.
Karl H. Andren
BY Lieber & Lieber
ATTORNEYS.

May 1, 1951 K. H. ANDREN 2,551,358

TERMINAL WIRING APPARATUS

Original Filed Dec. 19, 1942 12 Sheets-Sheet 6

INVENTOR.
Karl H. Andren
BY Lieber & Lieber
ATTORNEYS.

TERMINAL WIRING APPARATUS

Original Filed Dec. 19, 1942

INVENTOR.
Karl H. Andren
BY Lieber & Lieber
ATTORNEYS.

May 1, 1951 K. H. ANDREN 2,551,358

TERMINAL WIRING APPARATUS

Original Filed Dec. 19, 1942 12 Sheets-Sheet 8

INVENTOR.
Karl H. Andren
BY Lieber & Lieber
ATTORNEYS

May 1, 1951 K. H. ANDREN 2,551,358
TERMINAL WIRING APPARATUS
Original Filed Dec. 19, 1942 12 Sheets-Sheet 9
Fig. 20.
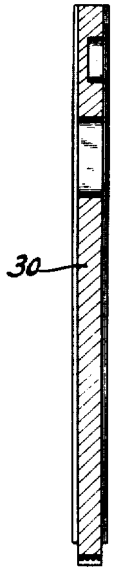
Fig. 19.
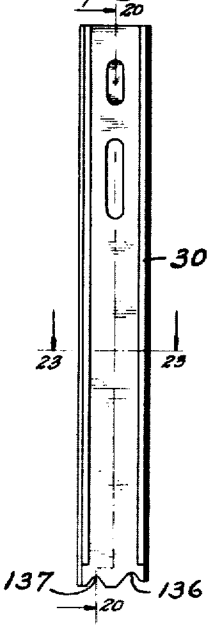
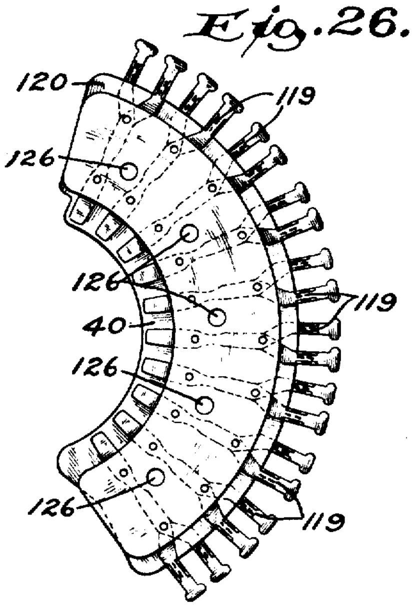
Fig. 26.
Fig. 25.
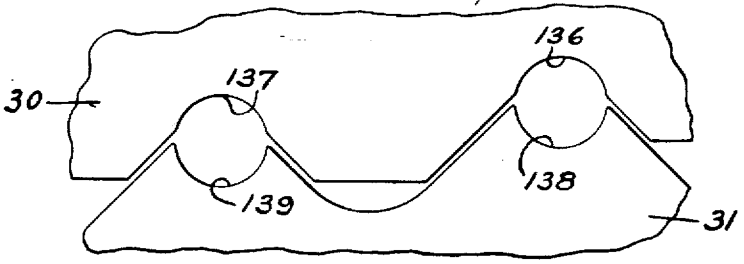
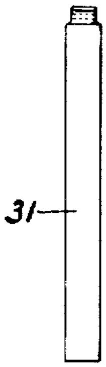
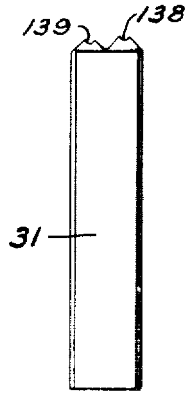
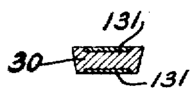
Fig. 23. Fig. 24.
Fig. 22. Fig. 21.
INVENTOR.
Karl H. Andren
BY Lieber & Lieber
ATTORNEYS.

May 1, 1951 K. H. ANDREN 2,551,358

TERMINAL WIRING APPARATUS

Original Filed Dec. 19, 1942 12 Sheets-Sheet 10

INVENTOR.

Karl H. Andren

BY Lieber & Lieber

ATTORNEYS.

May 1, 1951 K. H. ANDREN 2,551,358

TERMINAL WIRING APPARATUS

Original Filed Dec. 19, 1942 12 Sheets-Sheet 11

INVENTOR.
Karl H. Andren
BY Lieber & Lieber
ATTORNEYS.

INVENTOR.
Karl H. Andren
BY Lieber & Lieber
ATTORNEYS.

Patented May 1, 1951 2,551,358

UNITED STATES PATENT OFFICE 2,551,358

TERMINAL WIRING APPARATUS

Karl H. Andren, Greenfield, Wis., assignor, by mesne assignments, to Western Electric Company, Incorporated, New York, N. Y., a corporation of New York Continuation of application Serial No. 469,526, December 19, 1942. This application February 10, 1949, Serial No. 75,721

18 Claims. (Cl. 29—33)

This invention relates generally to improvements in the art of assembling a succession of relatively irregular but similar elements in predetermined order with a series of elongated members, and relates more specifically to an improved method of and apparatus for attaching successive groups of terminals to a plurality of sets of electrical conductors or wires, and to a new mode of combining the assemblages in stacks or banks, and this application is a continuation of my copending application, Serial No. 469,526, filed December 19, 1942, and now forfeited.

The primary object of this invention is to provide a new and useful method of and apparatus for expediting the attachment of successive similar elements such as groups or layers of telephone circuit terminals, to a plurality of elongated members, such as insulated current conducting wires, so that the assembled elements and members may be readily applied to and utilized in final assemblages such as telephone systems.

It has heretofore been common practice in the art of constructing and installing automatic telephone systems, to utilize numerous so-called terminal banks each consisting of a stack of terminal cards each in turn comprising two arcuate groups or flat layers of terminals separated by an arcuate sheet of insulation, these terminal banks being finally installed laterally adjacent to each other and having the corresponding terminals thereof connected in series by insulated conductor wires. The successive banks of terminal cards were heretofore assembled in stacks before the individual conductor wires were attached to the corresponding terminals thereof; and in order to effect such attachment, it was necessary to remove the insulation locally from each wire and to solder the bared portion of each wire to the proper terminal of each bank. Since each of these terminal banks measured only about four inches in length by one and one-half inches in width by one and one-quarter inches in height, and embodies approximately ten of the terminal cards each having twenty terminal connections, which, in the completed assemblages, are located only one-eighth of an inch apart, it must be apparent that the job of soldering a wire to each of these connections, as by the old method, was indeed very tedious, slow and costly, especially in view of the fact that thousands of the bank assemblages are required. In order to reduce electrical disturbances to a minimum, it is also desirable to twist each complementary pair of insulated conductor wires about each other on the opposite sides of each zone of attachment of the wires to the successive terminals, and it was extremely difficult, with the previous method of soldered attachment, to effect such twisting without disrupting the solder joints. These soldered connections of the prior assemblages were also relatively weak and subject to breakage due to handling and jolting, thus causing considerable trouble and annoyance and interfering with proper functioning of the allied apparatus. But in spite of all of these difficulties and disadvantages, the prior mode of producing and of assembling such terminal systems has been universally followed, primarily for want of a better substitute method of production.

It is, therefore, a more specific object of my present invention to provide an improved method of electrically interconnecting and of assembling such standard terminal layers, cards and banks in telephone systems in an expeditious manner and with vastly improved results.

Another specific object of the present invention is to provide a new method of more effectively wiring these telephone terminal banks without local removal of the insulation, without resorting to soldering, and without necessity of spreading and undesirably bending the terminals out of shape.

A further specific object of this invention is to provide an improved mode of attaching the conductors to terminal cards, and of twisting the complementary pairs of wires about each other on opposite sides of each zone of attachment, in a durable and methodical manner, and with the minimum manual labor, thereby producing superior assemblages at greatly reduced cost.

Still another specific object of my invention is to provide a new system of automatically and mechanically assembling the terminal layers and conductors of telephone control equipment, in a most reliable and accurate manner, at far greater speed than was heretofore possible, and so that the successive bank units will all be identical in structure.

An additional specific object of the invention is to provide various improvements in the construction and operation of apparatus for facilitating automatic exploitation of the improved terminal wiring and assembly method in an expeditious and methodical manner, and at minimum cost and maximum speed.

These and other specific objects and advantages of the present improvement will be apparent from the following detailed description.

A clear conception of the several steps of my improved method, and of the construction and operation of one type of apparatus for effecting automatic and commercial exploitation of the new method, may be had by referring to the drawings accompanying and forming a part of this specification wherein like reference characters designate the same or similar parts in the various views.

Fig. 19 is an enlarged front elevation of one of the upper punches;

Fig. 20 is a similarly enlarged irregular vertical section through the punch of Fig. 19, taken along the line 20—20;

Fig. 21 is a similarly enlarged front elevation of one of the lower dies;

Fig. 22 is a side elevation of the die of Fig. 21;

Fig. 23 is a transverse section through the punch of Figs. 19 and 20, taken along the line 23—23;

Fig. 24 is a top view of the lower die;

Fig. 25 is a greatly enlarged fragment of a cooperating set of punches and dies;

Fig. 26 is a plan view of a typical terminal card assemblage;

Figures 1, 2:
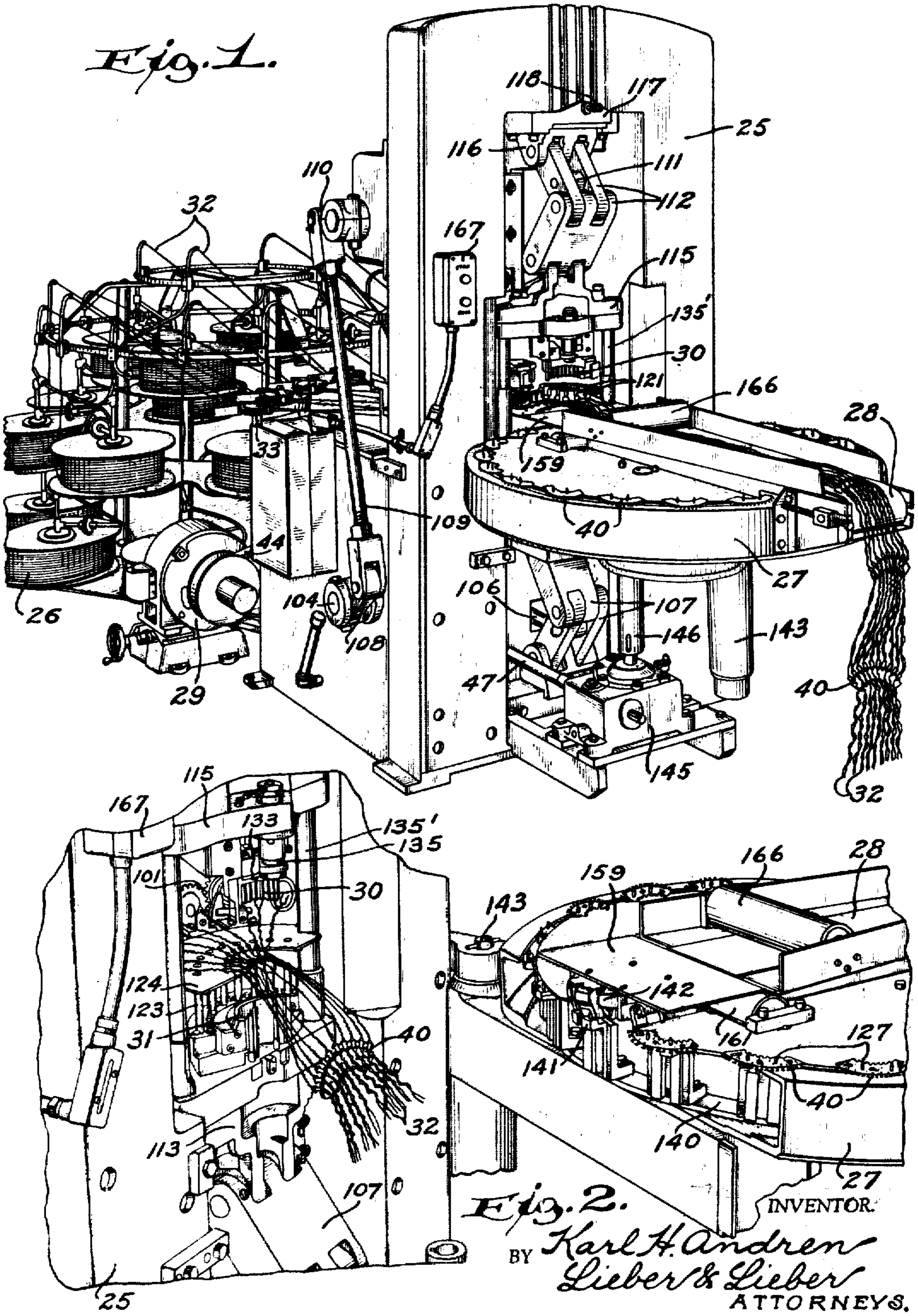
Fig. 1 is a front and side perspective view of a machine for carrying on my improved method of wiring telephone terminal assemblages, as it appears during normal operation.
Fig. 2 is a somewhat enlarged fragmentary similar perspective view of the terminal attaching punch and die assemblage of the machine, showing the terminal card supplying table swung out of normal position and away from the die mechanism so as to permit free access to the latter.

While the invention has been upon and described herein as being especially applicable for the purpose of attaching the corresponding terminals of successive similar arcuate groups to the same wires of a longitudinally advancing series without locally removing the insulation from the wires, and for twisting the complementary pairs of wires on opposite sides of each zone of attachment, it is not my desire or intent to thereby unnecessarily restrict the scope of the invention or the utility of the several features constituting the present improvement. These features, and particularly the steps of the improved method, may be advantageously utilized in conjunction with the production of other assemblages, and the term "layer" as used herein as applied to the terminals, is intended to include any pre-arranged relatively flat group of terminals or the like whether radially or otherwise disposed; while the term "card" is intended to include several coacting layers or groups of terminals usually separated by a layer of insulation but adapted to be handled as a unit; and the term "bank" includes a stack of two or more cards which are definitely positioned with respect to each other, and are likewise adapted to be handled as a unit.

In accordance with a practical embodiment of my present improved method of and apparatus for electrically connecting a plurality of terminal banks so that each terminal of each bank is connected by the same wire in series with the same or corresponding terminals of successive prearranged banks, a multiplicity of insulated wires are first received or withdrawn from independent sources of supply and are arranged in complementary pairs which are intermittently and longitudinally advanced along definite paths leading radially toward a common point or axis. Local successive zones of each complementary pair of wires, are then spaced apart, and the two wires of each pair are spun or twisted about each other on the opposite sides of each zone of separation. The successive spread zones of the pairs of wires are subsequently advanced and positioned adjacent to the terminals of arcuate groups or layers disposed adjacent to the point or axis toward which the wires are intermittently advanced, after which all of the terminals of each group are clamped to the proper wires while the latter are at rest, so as to produce electrical connections through the insulation and the zones of separation. The wires are then intermittently advanced longitudinally and approximately parallel to each other, and the same wires are always connected to the corresponding terminals of each of the successive layers and cards of the series. When a sufficient number of groups or cards have been thus attached to the advancing wires, the wires are cut into proper lengths, and the cards are assembled in properly and finally arranged stacks, whereupon the corresponding terminals of the banks will be electrically connected in series, and are ready for most effective cooperation with the brushes of the telephone system. In view of the fact that each card normally has twenty terminals disposed closely adjacent to each other and each of which must be electrically connected to an independent relatively fine insulated wire, the apparatus for automatically, effectively and rapidly spinning the complementary pairs of wires, and for feeding and interconnecting the wires and terminals, necessarily becomes quite complex, but such apparatus has been built and has proven highly satisfactory in carrying on the improved method.

Referring to the drawings, one type of improved apparatus for carrying on a commercial exploitation of the improved method, is a machine comprising a main stationary frame 25 having a plurality of independent insulated wire supply reels 26 mounted rearwardly thereof, and a card feeding table 27 and an assembly discharge conveyor 28 pivotally suspended from the forward portion thereof; while the lower part of the frame provide a housing for operating mechanism driven by a suitable motor 29, and the upper portion of the frame provides a support for the wire spinning and feeding mechanism and for the attaching punches 30 and dies 31, see Fig. 1. The main frame 25 may be durably constructed in any suitable manner as by utilizing sturdy welded plates, and while there is nothing special about the wire supply reels 26 and their mounting, there should be at least twenty of these reels some of which should preferably carry wire 32 having insulation of different external coloring from that of the other wires. Each of these reels should be provided with guide means for directing the wire 32 delivered therefrom toward a common point or axis disposed near the central front portion of the frame 25. In order to insure proper guiding of the individual insulated wires 32 from the supply reels 26 toward the fixed axial point, a series of sets of guiding and tensioning wheels 33 are provided, as clearly shown in Figs. 3, 4 and 5, and each of these sets of wheels 33 is adapted to coact with a selected pair of wires 32 having differently colored insulation.

From the guide wheels 33, each complementary pair of wires 32 extends into the rear end of a spinning or twisting rotor 34 journalled for rotation within a housing 35 secured to the main frame 25, and the central axes of rotation of all of the rotors 34 are disposed radially with respect to fixed central point or vertical axis of the machine, see Figs 3, 4, 5 and 10. Upon emerging from the front ends of the spinning rotors 34, the pairs of wires 32 extend past vertically movable spreaders 36 and between clamps 37 toward the corresponding punches 30 and dies 31, and each of the rotors 34 is provided with a set of swingably suspended wire guiding fingers 38 with which another set of clamps 39 is cooperable in order to insure proper cooperation of the adjacent spreader 36 with the wires 32, see Figs. 5, 10, 12 and 13. There is a set of cooperating punches 30 and dies 31 for attaching each complementary pair of wires 32 to the corresponding terminals of the successive terminal cards 40 when these cards have been delivered in succession into the zone of action of the punches and dies, and after the successive equally spaced spread zones of the pairs of wires 32 have been advanced into such zone of action of the attaching elements, so that ten independent sets of punches 30 and dies 31 should be provided if ten pairs of wires 32 are to be simultaneously attached to successive cards 40 each having twenty corresponding terminals. The cards 40 are adapted to be fed laterally and successively into the zone of action of the punches 30 and dies 31, by the table 27, and the spun and locally spread pairs of wires 32 are adapted to be advanced toward these zones by means of reciprocable slides 41 having sets of feed fingers 42, 43 adapted to pick the successive spread portions of the wires from the spreaders 36, while the conveyor 28 functions to deliver the assembled wires 32 and cards 40 from the attaching zone across the top of the table 27, see Figs. 1 and 10.

Figure 6:
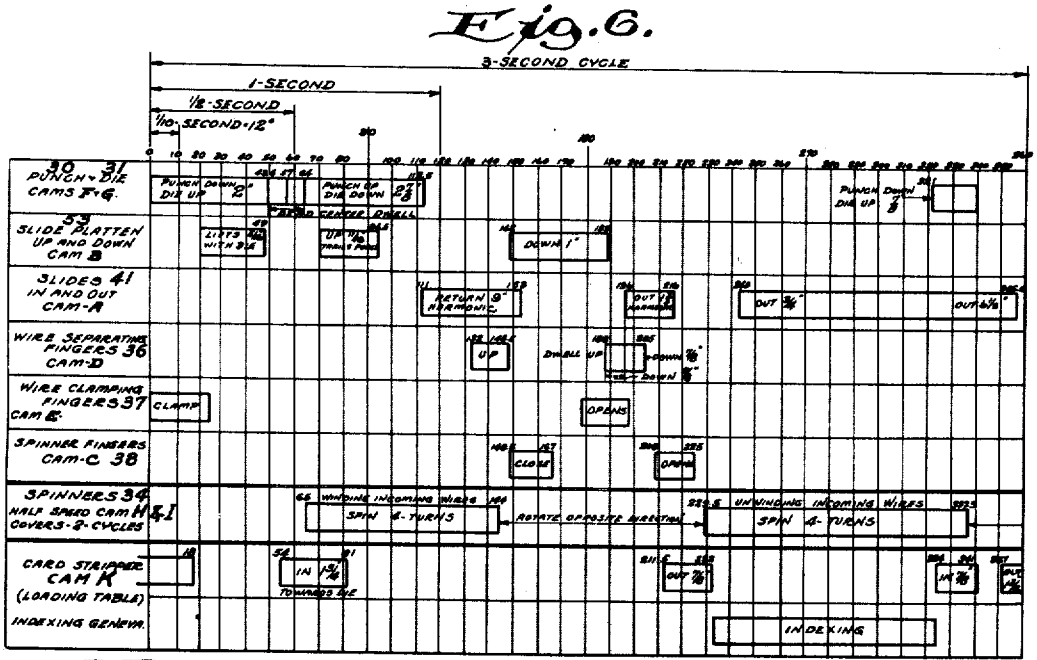
Fig. 6 is a chart showing the timing and sequence of the several successive steps of the improved wiring method as carried on by the improved automatic machine.
Figure 7:
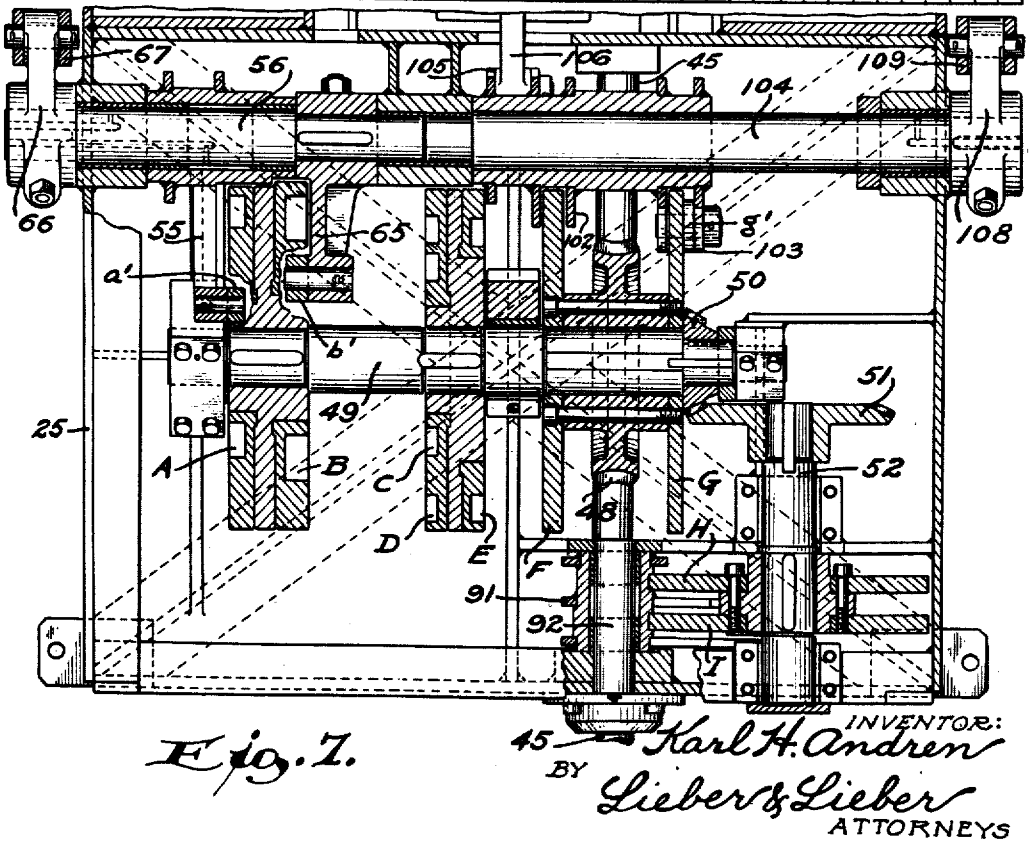
Fig. 7 is a central horizontal section through the main gear box and cams for producing properly timed operation of the several mechanisms so as to methodically carry on the successive steps.
Figures 8, 9:
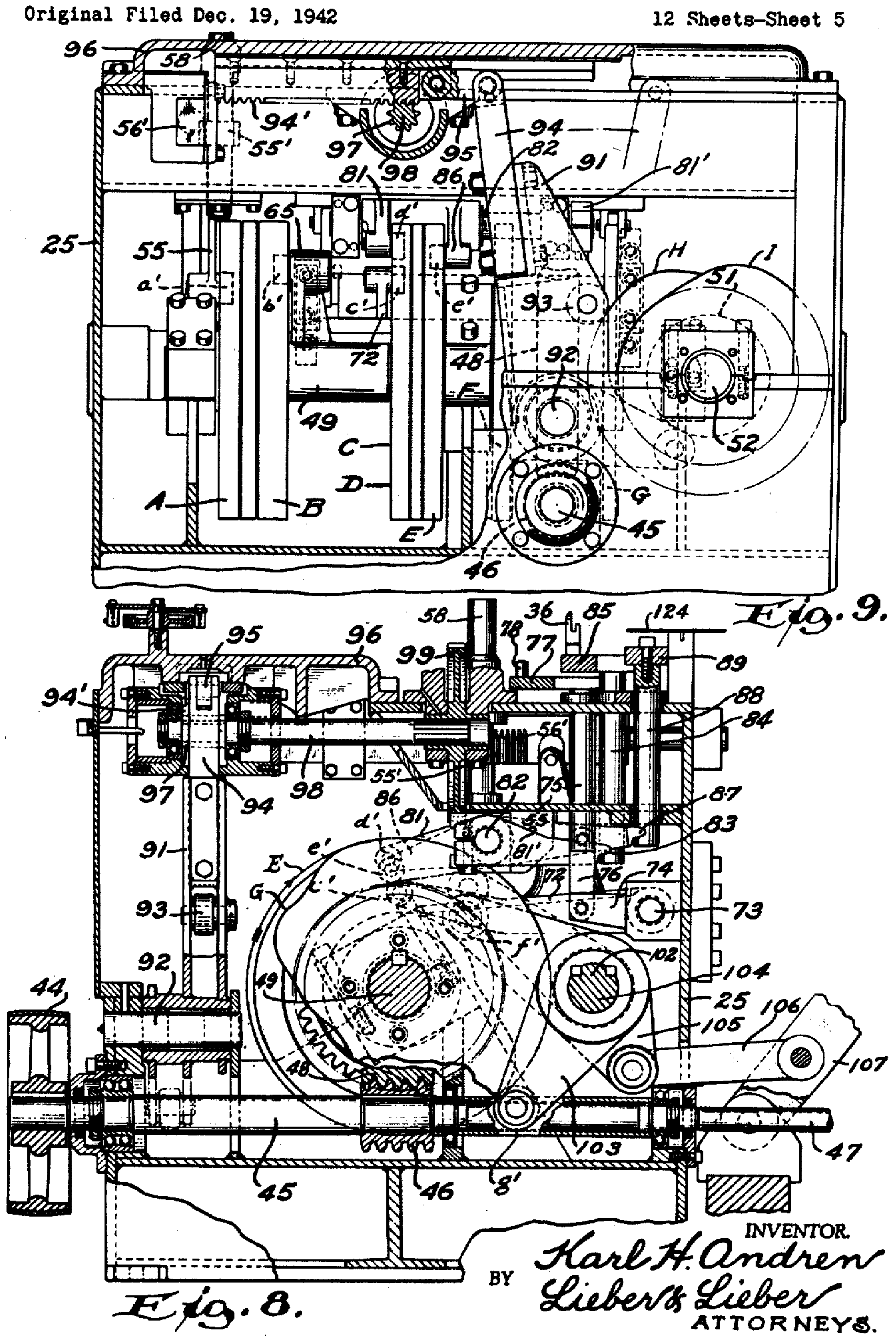
Fig. 8 is a central vertical section through the main gear box and cam mechanisms of Fig. 7, showing some of the cams in dot-and-dash lines for the sake of clearness.
Fig. 9 is a part sectional elevation of the gear box and driving cam assemblage, looking toward the left end of Fig. 8.

With the machine specifically shown, each complete cycle during which the wires 32 are spun and advanced and the card 40 is attached, consumes three seconds, and the sequence of operations and the functioning of the mechanism for performing the several successive steps, can perhaps be most readily understood by referring to the chart of Fig. 6, and to the details of the operating mechanism shown in Figs. 7, 8 and 9. The driving source or motor 29 may be connected by means of belting 44 and suitable pulleys, to a main horizontal drive shaft 45 journalled in a housing forming part of the main frame 25, and this shaft 45 carries a worm 46 and has a front end extension 47 for driving the card feed and the final discharge conveyor 28 as will be later explained. The worm 46 meshes with a worm wheel 48 secured to a counter shaft 49 which is also journalled in the frame housing, and this counter shaft 49 carries cams A, B, C, D, E, F, G and also carries a bevel pinion 50 meshing with a bevel gear 51 mounted upon another counter shaft 52 which carries additional cams H, I, so that rotation of the drive shaft 45 by the motor 29 will result in simultaneous rotation of all of the cams. From the chart, it will be apparent that the cam A horizontally reciprocates the wire advancing or feed slides 41; the cam B actuates a vertically reciprocable platen 53 which carries the slides 41 with their feed fingers 42, 43; the cam C actuates the spinner fingers 38 by operating the clamps 39; the cam D actuates the separating fingers or spreads 36, the cam E actuates the wire clamping fingers or clamps 37; the cams F and G actuate the punches 30 and dies 31; and the cams H and I actuate the spinners or wire twisting rotors 34.

Figure 4:
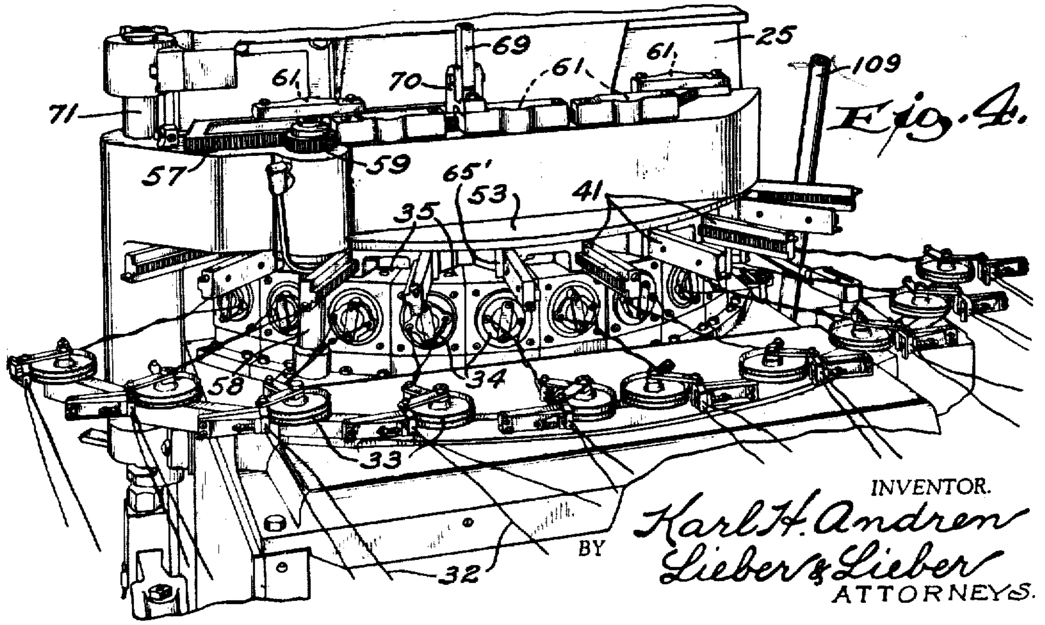
Fig. 4 is a somewhat smaller fragmentary rear perspective view of the wire feeding and spinning or twisting mechanism, also showing the wire advancing slides for periodically feeding the successive locally spread and twisted wire portions toward the clamping punch and die.
Figure 5:
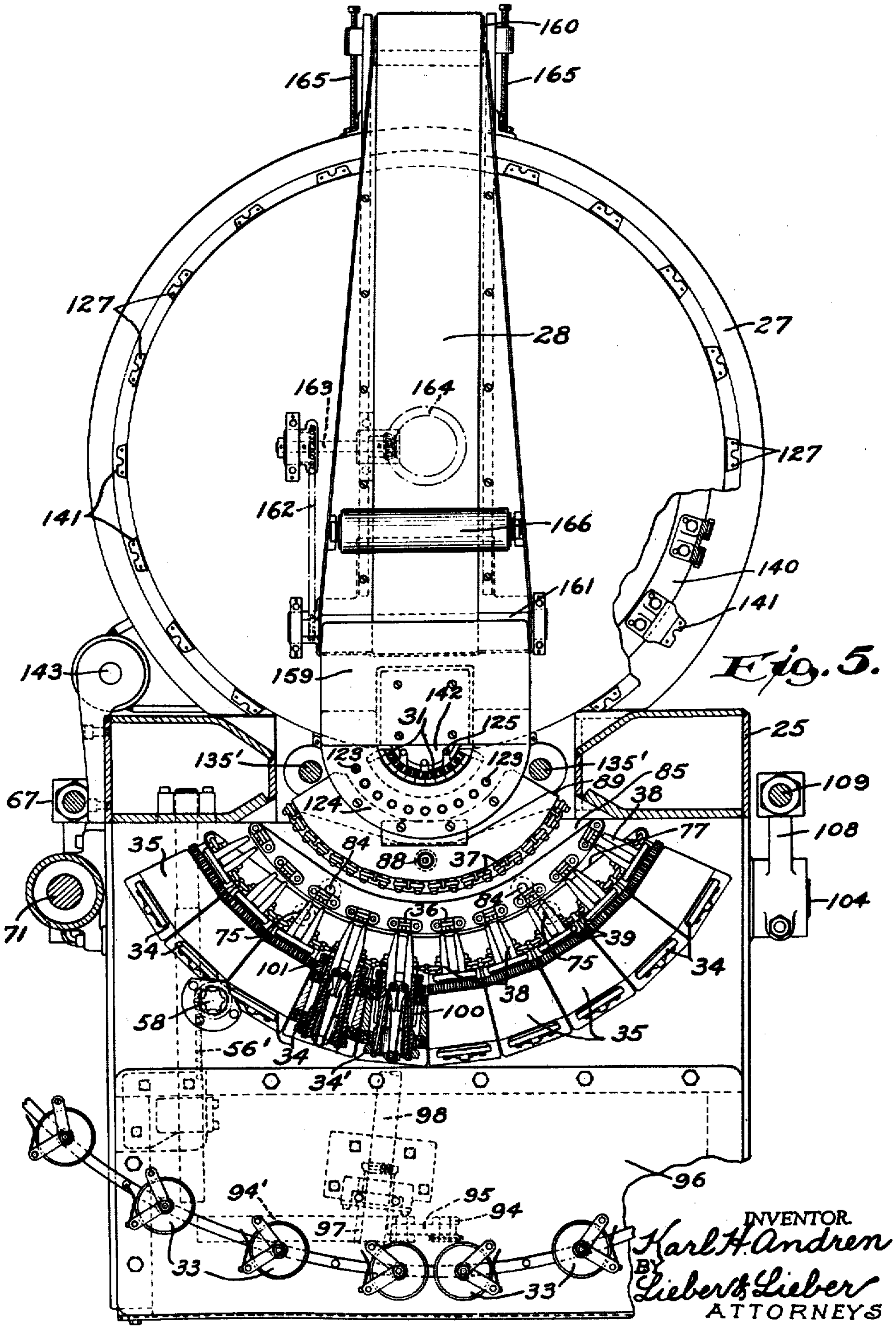
Fig. 5 is a horizontal section through the improved machine taken between the punch and die and showing several of the wire spinning or twisting rotors in section.
Figures 17, 18:
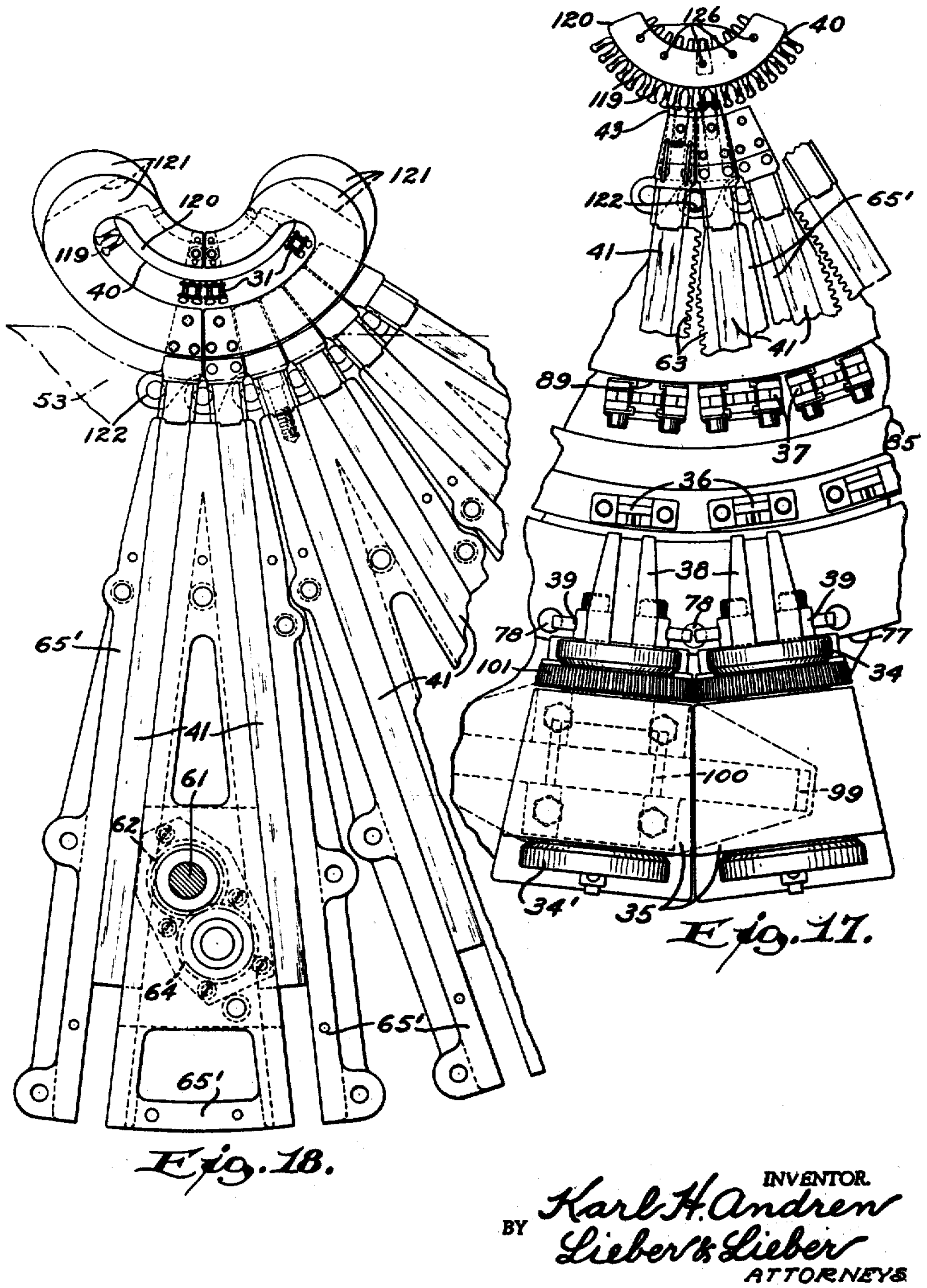
Fig. 17 is a fragmentary top view showing several of the wire spinning rotors, clamps and spreaders, and also showing fragments of several of the wire advancing slides coacting with a terminal card.
Fig. 18 is a horizontal section through several of the terminal clamping punches and through one of the five slide operating shafts, looking down upon fragments of a number of the wire advancing slides and the guides.

The groove cam A coacts with a roller a' carried by the swinging end of a lever 55 which is freely swingably suspended from a horizontal counter shaft 56 and also carries a roller coacting with a slotted rack 56', see Figs. 5 and 8. A double rack 57 slidably mounted upon the upper platen 53 is horizontally reciprocable by an upright drive shaft 58 having a lower pinion 55' coacting with the rack 56' and an upper pinion 59 coacting with the teeth on the rear side of the rack 57, see Figs. 4, 7 and 10. Because of the fact that the platen 53 is vertically movable relative to the main frame 25, the driving connection between the shaft 58 and the lower pinion must be splined so as to permit desired periodic vertical reciprocation of the platen 53. The reciprocable double rack 57 has teeth on both sides, the front set of which is cooperable with two driven pinions 60 carried by the upper ends of upright counter shafts 61, and the rear set of which is likewise cooperable with three pinions 60 and counter shafts 61. The lower ends of the counter shafts 61 are secured to pinions 62 which coact with rack teeth 63 formed on the slides 41, and in order to permit the use of only five counter shafts 61 for the purpose of reciprocating ten wire feeding slides 41, each of the pinions 62 is caused to coact with an idler pinion 64 which cooperates with the teeth 63 on an adjacent slide 41 as illustrated in Fig. 18. The cam A is therefore constructed and mechanically connected to the slides 41 in such manner that continued rotation of the cam A will produce simultaneous periodic inward and outward movement of the ten slides 41 radially of the central vertical axis of the machine, and the timing of these reciprocations is clearly indicated upon the chart of Fig. 6.

Figure 3:
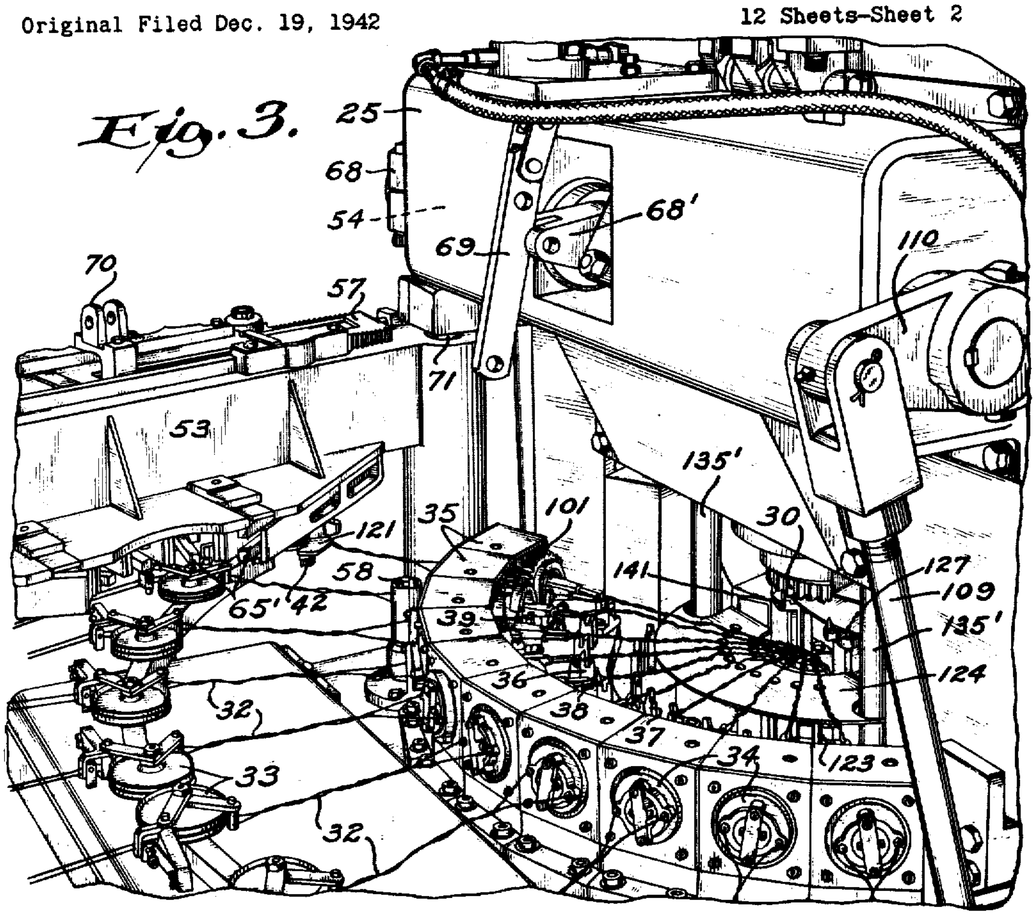
Fig. 3 is a further enlarged rear and side perspective view of a fragment of the improved machine, showing a portion of the punch and die mechanism and the spinning mechanism for twisting the complementary pairs of conductor wires about each other on the opposite sides of successive spread zones thereof.

The groove cam B which slides the platen 53 up and down so as to permit proper cooperation of the feed fingers 42, 43 with the wires 32, coacts with a roller b' carried by the swinging end of a lever 65 which is keyed to one end of the shaft 56, and a similar lever 66 is keyed to the opposite end of this shaft. The swinging end of the lever 66 is connected by means of links 67 with an upper lever 68, shaft 54 and lever 68', pivotally suspended from the upper portion of the main frame 25, as shown in Fig. 3, and which lever 68' is connected to the platen 53 by means of an intermediate link 69 coacting with ears 70 formed on the platen 53, see Figs. 3 and 4. This mechanical connection between the lever 65 and the platen 53 is such that the continued rotation of the cam B will periodically slide the platen 53 up and down at properly timed intervals. The slides 41 are mounted for radial reciprocation within guides 65', as clearly shown in Fig. 18, and the platen 53 and the slides 41 and guides 65', which are carried thereby, are preferably mounted so as to swing as a unit about a pivot 71 disposed at one side of the frame 25, so that the slide and platen assemblage may be swung out of normal position and will permit free access to the wire advancing fingers 42, 43, as clearly shown in the perspective view of Fig. 3. The timing of the up and down movement of the platen 53 is also clearly indicated upon the chart of Fig. 6.

Figures 10, 11, 12, 13:
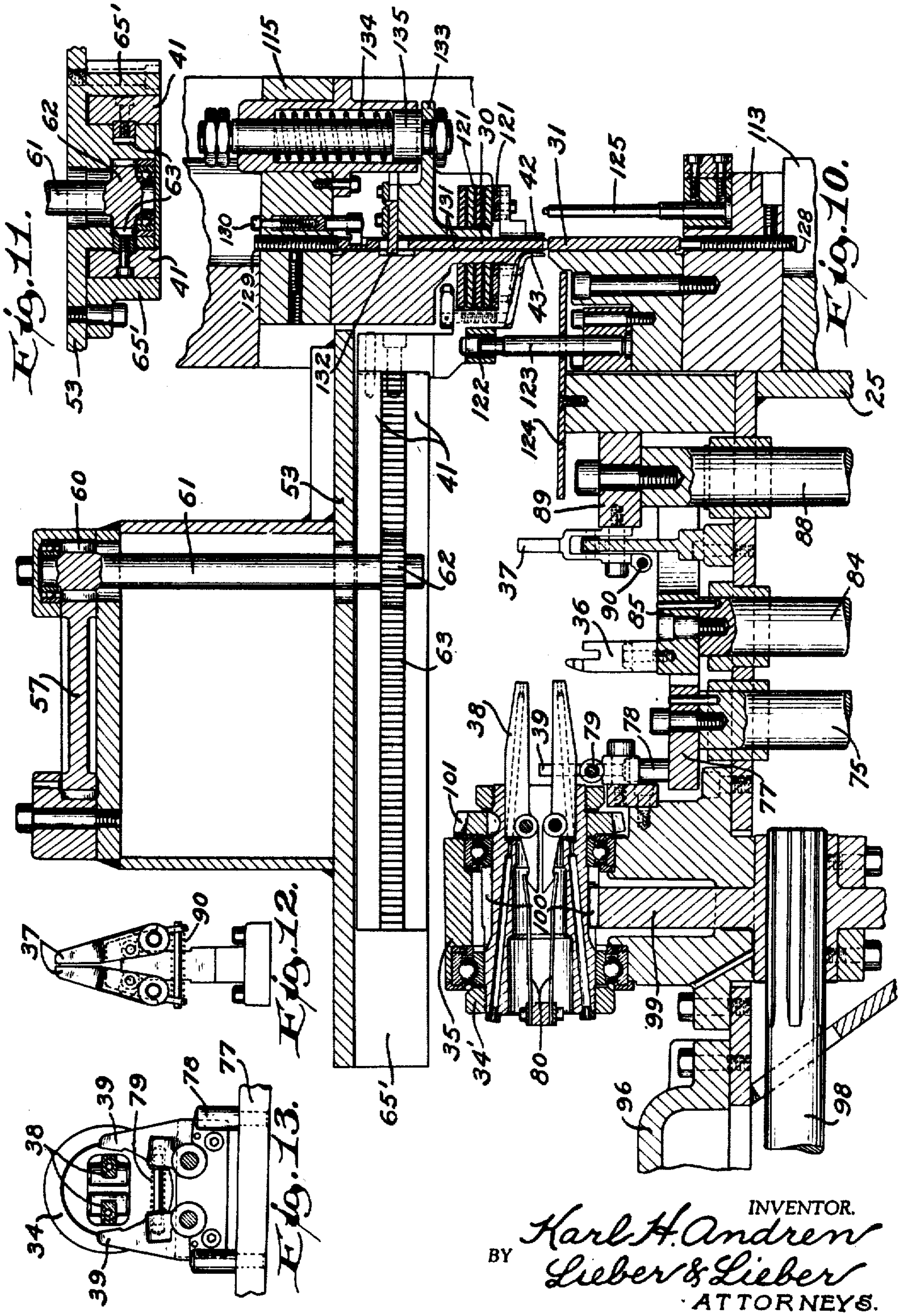
Fig. 10 is an enlarged fragmentary vertical section through the active assembly portion of the machine, showing the punch in lowered position and coacting with the die, the wire separating and spinning mechanism, and the wire clamping and advancing mechanism, the wire spreader being shown in lowered position and the pick up fingers coacting with the push and die.
Fig. 11 is a transverse vertical section through the complementary wire advancing slides showing the driving pinion coacting with the rack teeth of one of these slides.
Fig. 12 is a front view of one of the wire holding clamps for limiting the spinning or twisting action between successive zones of attachment of the terminals to the wires.
Fig. 13 is a part sectional front view of one of the wire spinning or twisting rotors and of the clamps coacting with the pivoted guide fingers thereof to properly position the twisted or spun pairs of wires upon the adjacent spreader wedge.

The groove cam C, which is adapted to actuate the spinner fingers 38 by operating the clamps 39, one of which is associated with each set of the fingers 38, coacts with a roller c' carried by a lever 72 secured to a pivot shaft 73, see Figs. 8, 9 and 10. A pair of levers 74 are also secured to the pivot shaft 73 and are pivotally connected to the lower end of a pair of vertically sliding shafts 75 by means of links 76. The upper ends of these slides 75 carry an arcuate plate 77 which carries pins 78 adapted to coact with the arms of the clamp 39, as clearly shown in Figs. 5 and 13, in order to swing these arms toward each other in opposition to the spreading pressure normally exerted by a compression spring 79. The inward movement of the clamp arms 39 is limited so that these arms may urge the hollow wire guiding fingers 38 of the spinning rotors 34 toward each other to a predetermined extent whereby the fingers 38 will definitely space the local zones of the advancing wires 32 apart after the complementary pairs of wires have been spun or twisted about each other in advance of these local zones. Whenever the plate 77 is lowered and the clamps 39 are spread apart by the springs 79, the spinner fingers 38 will also be spread apart by leaf springs 80 coacting therewith, see Fig. 10. The cam C should be constructed so that the clamps 39 will become effective only when the fingers 38 are disposed in the same horizontal plane, and after a predetermined number of turns of the rotors 34 has been effected, as indicated by the chart of Fig. 6.

The groove cam D, which actuates the spreaders 36 for retaining the successive local zones of the pairs of advancing wires 32 in properly spread condition for coaction with the feed fingers 42, 43, coacts with the roller d' of a lever 81, which is swingably suspended from a pivot shaft 82, and the opposite swinging end of the lever 81 comprises an arm 81' secured to the shaft 82 and provided with a tooth 83 coacting with a recess at the lower ends of a pair of vertically movable slides 84 the upper end of which carry an arcuate plate 85, see Figs. 7, 8 and 10. The spreaders 36 are all mounted directly upon the vertically movable arcuate plate 85, and the movement of this plate is timed so as to cause the spreaders 36 to raise and to enter the successive spread and properly spaced local zones between the pairs of wires 32 after the same have been spun or twisted about each other in front of these local zones, and while the spinning fingers 38 of the adjacent rotors 34 are at rest and are being acted upon by the clamps 39. The timing of the movement of the spreaders 36 is likewise clearly indicated upon the chart of Fig. 6.

The sole remaining groove cam E which actuates the wire clamps 37 for limiting the extent of twisting of the complementary pairs of wires 32 by the spinning rotors 34, coacts with a roller e' carried by one end of a lever 86 which is swingable upon the pivot shaft 82, and the opposite swinging end of which is provided with a tooth 87. The tooth 87 engages a recess in the lower end of a vertically slidable shaft 88, the upper end of which carries an arcuate plate 89. The plate 89 is cooperable with all of the wire clamps 37 so as to spread the jaws theerof in opposition to the action of springs 90 which normally tend to close these jaws, as shown in Fig. 12, and the timing of the operation of the clamps 37 relative to the adjacent spreaders 36 and spinning rotors 34 is also shown on the chart of Fig. 6.

While the punch and die actuating cams F and G, are next in order, it appears more desirable to now specifically describe the spinner or rotor actuating cams H and I, and other mechanism for revolving the rotors 34 so as to twist the several pairs of wires on opposite sides of successive spread zones. The cams F, G, H, I differ from the cams A, B, C, D, E, in that the latter are internal or groove cams, while the former are external or peripheral cams. As previously indicated, the rotor actuating cams H, I are mounted upon the counter shaft 52, which is rotated at half speed by the bevel gearing 50, 51 so that the rotors 34 during one cycle will revolve in one direction to twist, and during the next cycle revolves in the opposite direction to again twist, the complementary pairs of wires 32 about each other. From Figs. 7, 8 and 9 it will be apparent that one of the cams H, I coacts with one arm of a bell-crank lever 91 which is swingably suspended from a fixed stub shaft 92, and the other cam coacts with a roller 93 carried by the other upwardly directed arm of the lever 91. This other arm of the lever 91 has a winging extension 94 which is connected to a rack 94' by means of a link 95; and the rack 94' is slidably suspended from a cover 96 and engages a pinion 97 secured to a shaft 98 which is journalled in the cover 96. The shaft 98 has a spur gear 99 secured to an end thereof, and this gear 99 meshes with an annular series of teeth 100 formed on the medial portion of one of the spinning rotors 34' as shown in Figs. 5, 10 and 17, so that oscillation of the lever 91 by the cams H, I, will cause the toothed rotor 34' to rotate four turns in a predetermined direction, twice during each cycle of operation. This rotary motion which is imparted to the rotor 34' by the gear 99, is imparted to the adjacent rotors 34 and from thence to all other rotors 34, by means of slightly bevelled coacting annular series of teeth 101 formed on the rotors 34, 34' and coacting with each other as indicated in Figs. 5, 10 and 17; and when the rotor 34' revolves, alternate rotors 34 of the series revolve in the same direction, while the intermediate rotors revolve in the opposite direction. The spinner fingers 38 which are pivotally suspended from their carrying rotors 34, 34' and through which the wires 32 are fed, revolve with the rotors and are normally spread apart by the springs 80 as shown in Fig. 10. The timing of the rotation of the rotors 34, 34' relative to the other steps of the method, is also clearly indicated upon the chart of Fig. 6.

Figures 14, 15, 16:
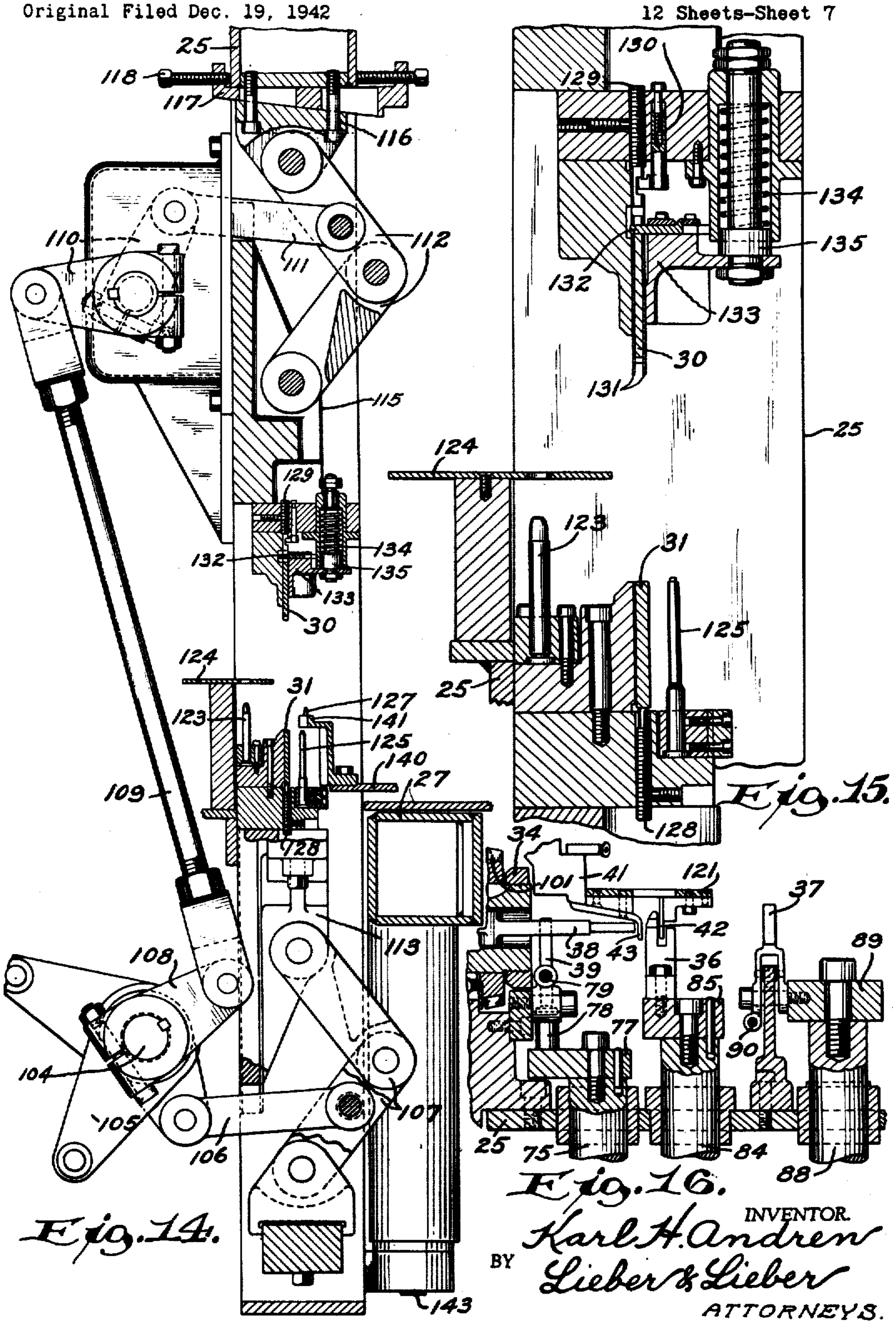
Fig. 14 is an irregular vertical section through the frame and through the punch and die mechanism for clamping the terminals to the wires, showing the punch and die separated or spread apart.
Fig. 15 is a vertical section through the separated punch and die mechanism, similar to that of Fig. 14 but enlarged sufficiently to show the action of the strippers.
Fig. 16 is a sectional view of one of the spinning rotors, spreader and clamps similar to Fig. 10, but showing the clamps in action and the intervening spreader elevated.

The punch and die actuating cams F, G, must cooperate perfectly with cam A for moving the slides 41 in and out to feed the wires 32 longitudinally, and with the cam B for moving the platen 53 and the slides 41, up and down, in order that the wire advancing fingers 42, 43 will not interfere with the down and up motion of the punches 30 and dies 31. As shown in Figs. 7 and 8, the cams F, G which are carried by the counter shaft 49, coact respectively with rollers f', g' carried by the swinging ends of lever arms 102, 103 secured to a pivot shaft 104. Another lever arm 105 which is an extension of lever arm 102, is connected by means of a link 106 to a set of lower toggle links 107; while still another lever arm 108 which is secured to the outer end of the shaft 104 is connected by means of a connecting rod 109, bell crank lever and shaft assembly 110 and link 111, to a set of upper toggle links 112, see Figs. 7, 8 and 14. The lower toggle 107 is connected to a slide 113 movable vertically along the frame 25 and which carries the lower dies 31, while the upper toggle 112 is likewise connected to a slide 115 movable vertically along the frame and from which the upper dies or punches 30 are suspended, and the reaction block 116 for at least one of the toggles 107, 112 should be made vertically adjustable relative to the frame 25 as by means of an adjusting wedge 117 movable with the aid of adjusting screws 118, as shown in Fig. 14. The punches 30 and the dies 31 will obviously be moved vertically and in opposite directions, when the cams F, G are being rotated by the shaft 49, and these cams should be formed to produce the desired dwell and other action of the punches and dies so as not to interfere with the movements of the slides 41 and fingers 42, 43. The timing of the operation of the punches and dies is likewise clearly indicated by the chart of Fig. 6.

Because of the fact that the machine must be capable of simultaneously attaching twenty insulated wires 32 to the closely adjacent terminals 119 of each of the successive cards 40, each comprising ten complementary pairs of terminals 119 arranged in layers and separated by sheets 120 of insulation, as shown in Fig. 26, the punches 30 and dies 31 must necessarily be small yet extremely strong and durable, see Figs. 10, 14, 15, 17, and 19 to 25, inclusive. Each individual punch 30 is adapted to cooperate with a pair of complementary wires 32 and terminals 119 as the successive spread zones of the wires 32 after having been twisted about each other on opposite sides of each zone by the rollers 34, have been picked up by the corresponding sets of fingers 42, 43 and advanced to the zone of action of the dies. The attachment of the transfer fingers 42, 43 to their carrier slides 41 must be such that the adjacent sets of these fingers 42, 43 can spread out as each slide 41 travels its own radial path, and since the fingers 42, 43 remain in forward position while the wires 32 are actually being clamped to the terminals 119 by the punches 30 and dies 31 the movable punches and dies must be adapted to pass between the front and rear pick up fingers 42, 43, see Fig. 10. The complementary sets of fingers 42, 43 are therefore suspended from their respective carrying slides 41 by means of U-shaped plates 121 which clear over each other and some of which are longer than others as shown in Fig. 18. There are five sets of these relatively slidable finger suspension plates 121 on each side of the vertical central plane of the machine, and each slide 41 is provided with a positioning bushing 122 which is cooperable with an adjacent vertically movable positioning pin 123 carried by the lower die supporting slide 113, see Figs. 10, 14 and 18. The pins 123 are also adapted to pass through a series of openings in a stationary stripper plate 124, and the lower slide 113, besides supporting the dies 31, also carries three parallel upright front positioning pins 125 shown in Figs. 5, 10, 14 and 15 which are cooperable with the central and two outer openings 126 in the successive cards 40 so as to accurately position the terminals 119 while the wires 32 are being attached thereto, and to also lift the cards from their transfer pins 127 carried by the card supply table 27 and which normally coact with the two intermediate openings 126 of the cards 40, see Figs. 14 and 17.

The lower dies are clamped as an arcuate series in the slide 113 as shown in Fig. 5, and may be individually adjusted by means of set screws 128 coacting therewith, see Fig. 15. The upper dies or punches 30 are secured in a similar manner to the upper slide 115, and these punches may also be individually adjusted by means of set screws 129, and hooks 130 coacting therewith; and each of the punches 30 is also provided with a set of opposed strippers 131 as shown in Figs. 10, 15 and 23. Thees strippers 131, which force the wires 32 along the fingers 42, 43 and into the terminals 119 before the punches act, are slidably mounted in grooves in the punches 30, and are engaged by fingers 132 secured to the front stripper retainer 133 which is urged downwardly by a compression spring 134 coacting with a plunger 135 so that when the punches 30 are lifted away from the lower dies 31, the strippers 131 will move downwardly to the position indicated in Fig. 15. The punches 30 and dies 31 are preferably guided for vertical movement by parallel rods 35' coacting with the slides 113, 115; and are adapted to coact with each other in the narrow arcuate zone between the fingers 42, 43 as indicated in Figs. 10 and 18; and each punch 30 has upper and lower recesses 136, 137 which are cooperable with upper and lower sockets 138, 139, respectively, of the complementary die 31 so as to simultaneously clamp the terminals 119 of superimposed layers to the adjacent pair of wires 32, see Fig. 25.

The mechanism for feeding or supplying the successive cards 40 each comprising two layers of terminals 119 separated by a stiff sheet 120 of insulation, to the zone of action of the punches and dies as shown in Figs. 1, 2, 5, 14, 27 and 28, and comprises a table 27, an annular rotor or member 140 rotatably mounted upon the table 27 and having an annular series of pads 141 each provided with two of the card advancing pins 127, a horizontally and vertically movable plate 142 cooperable with the positioning pins 125 of the lower die slide 113 to assist the pins 125 in transferring the cards 40 and to strip or remove the completed wire and card assemblages from these pins, the gearing operable by the drive shaft 47 to index the member 140 and to actuate the plate 142. The table 27 is pivotally suspended from the front of the main frame 25 by means of an upright hinge pin 143 so as to permit the table 27 to be swung out of normal position as shown in Fig. 2; and the drive shaft 47 which is an extension of the main drive shaft 45, is connected with a vertical shaft 144 journalled in the table 27, through reduction gearing confined within a gear box 145 and through a removable coupling 146, see Fig. 27. The shaft 144 is connected by spur gears 147, 148 to a counter shaft 149 which is journalled in the rotary member 140 but is also free to rotate relative to the table 27; and the counter shaft 149 coacts through Geneva gearing 150 with a pinion 151 journalled on a fixed stub shaft 152 and coacting with an internal annular or ring gear 153 which is secured to the card feed rotor or member 140. A rotary cam 169 attached to the shaft 149 has a cam groove K which cooperates with a lever 170 attached to an oscillatory pivot shaft 154 mounted upon the table 27, and this shaft 154 carries an arm 155 which is connected to the stripper plate 142 by means of a connecting rod 156 coacting with a lever 157 and coacting with another arm 158 to produce swinging movement of the plate 142. The card feed assemblage is obviously so constructed, that when the drive shaft 47 is being continuously rotated, the card transporting member 140 will be intermittently revolved by the Geneva gearing 150 by steps equal to the distance between centers of the successive pads 141, and the stripper plate 142 will be actuated during each successive advancement of the rotor 140 so as to press the cards 40 onto the pins 125 and to thereafter remove the attached cards 40 from the positioning pins 125. From the chart of Fig. 6, it will be noted that each interval of intermittent rotation of the member 140 consumes three seconds, and the successive cards 40 may be positioned upon the conveying pins 27 of the advancing pads 141 by one or more attendants stationed about the table 27.

Figures 27, 28:
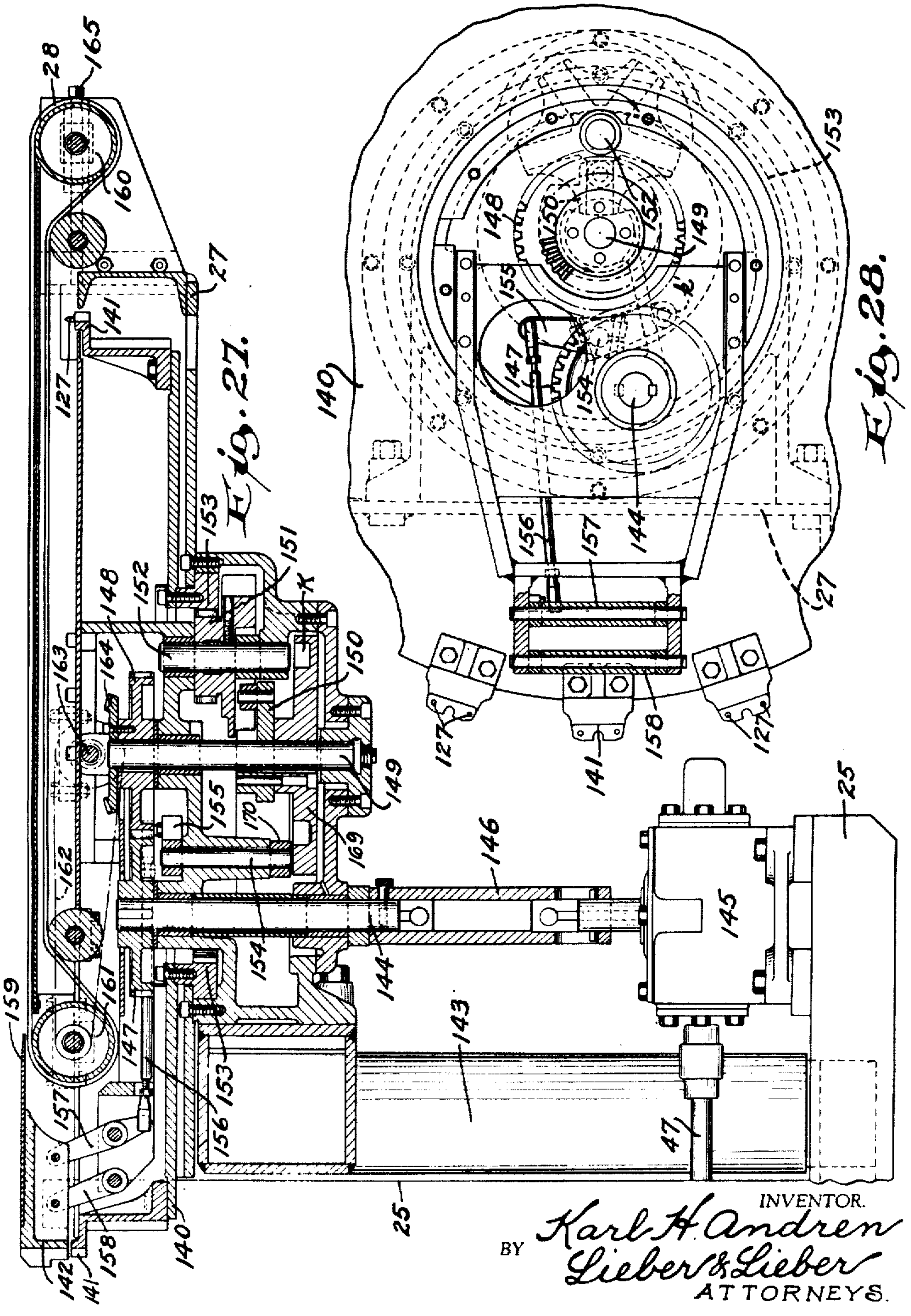
Fig. 27 is a central vertical section through the card feed or supply table and through the final assembly discharge conveyor.
Fig. 28 is a part sectional fragmentary top view of the card supply table with the final discharge conveyor removed therefrom.

The final assembly discharge conveyor 28 is mounted upon the table 27 above and independently of the rotor member 140, and in approximately horizontal alinement with a plate 159 extending rearwardly from the stripper plate 42, by means of rollers 160, 161 of which the roller 161 is positively rotated by means of a chain drive 162, see Figs. 5 and 27. This chain drive 162 is constantly operated from a horizontal shaft 163 which is journalled on the table 27 and is connected to the vertical central shaft 149 by means of bevel gearing 164, and the tension of the endless conveyor 28 may be adjusted with the aid of tensioning screws 165. An ironing roll 166 may also be provided above the conveyor belt as illustrated in Figs. 1, 2 and 5; and the conveyor 28 is adapted to deliver the wire and card assemblages from the machine in the manner depicted in Fig. 1 with the wires 32 disposed approximately parallel to each other and the corresponding terminals of the successive equally spaced cards 41 firmly clamped to the same wires 32 of the series. The machine should also be provided with a suitable control switch 167 preferably mounted upon the main frame 25 near the card supply and assembly discharge table 27.

During normal operation of the improved machine while carrying on commercial exploitation of the improved card wiring method, one or more attendants should be stationed about the card supply table 27 in order to apply card assemblages 40 to the conveying pins 127 of the successive pads 141, and the reels 26 should all be provided with abundant supplies of insulated wire 32, whereupon operation of the rotor 29 by actuation of the switch 167 will set all of the mechanisms in motion. The successive steps of the method will then be carried on automatically as depicted in the diagrams of Figs. 29 to 35, inclusive, and the corresponding locations of the various operating elements are indicated by degrees on the chart of Fig. 6, it being understood that each complete cycle of operation is represented by 360° on the chart.

Figure 29:
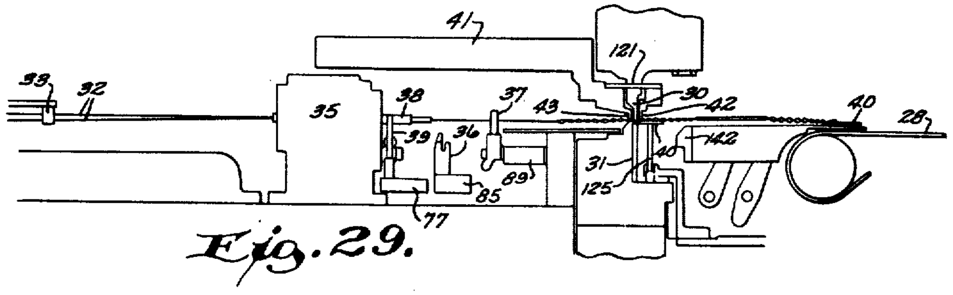
Figs. 29 to 35, inclusive, are diagrams showing the successive steps of the improved method.

The diagram of Fig. 29 shows the relative location of the operating elements at 50° from the starting point of Fig. 6. The stripper 142 has been withdrawn, and this withdrawal has permitted the lower dies 31 and locating pins 125 to move upwardly with the card 40, into the position shown, and the upper punch 30 and lower die 31 are acting to crimp the wires 32 into the terminal sockets of the card 40. The slide 41 with its fingers 42, 43, is holding and guiding the wires 32 into the terminal sockets, and the complementary wires 32 of each pair have been spun on opposite sides of the zone of attachment to the terminals. The clamp 37 is clamping the wires 32 in preparation for the next spinning operation.

Figure 30:
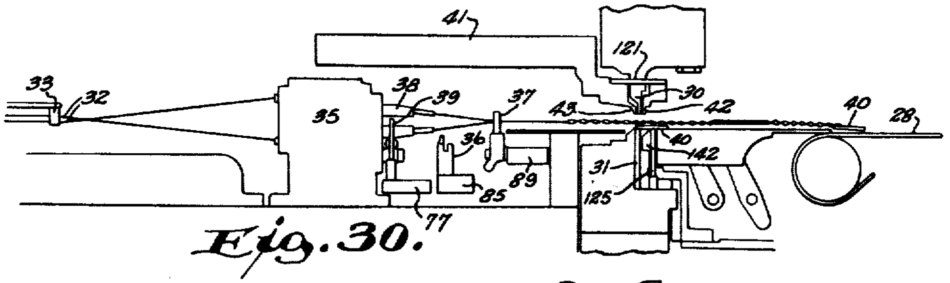

The diagram of Fig. 30 shows the relative location of the operating elements at 80° from the starting point of Fig. 6. The stripper 142 has just moved inwardly underneath the card 40, the punch 30 and die 31 are separating, and the card 40, with the wires 32 attached thereto, is being stripped from the die 31. The slide 41 is rising so as to clear the wires for its return trip, and the wire clamp 37 is still holding the wires 32 so as to limit the extent of twisting or spinning. The spinner fingers 38 have just started to spin the next section of the complementary wires of each pair.

Figure 31:
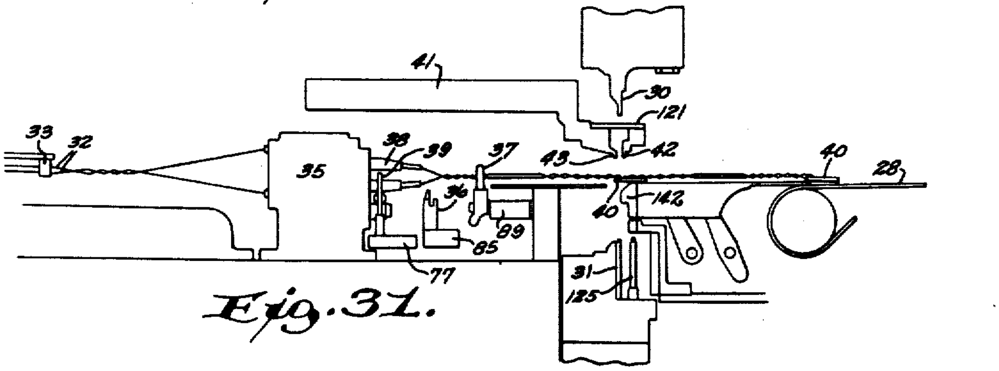

The diagram of Fig. 31 shows the relative location of the operating elements at 112° from the starting point in Fig. 6. The spinner fingers 38 have partially completed the spinning operation which was commenced in Fig. 30, the punch 30 and die 31 have separated completely, and the slides 41 are fully elevated and ready to start on their return trip in order to pick up the next zone of separation between the wires 32.

Figure 32:
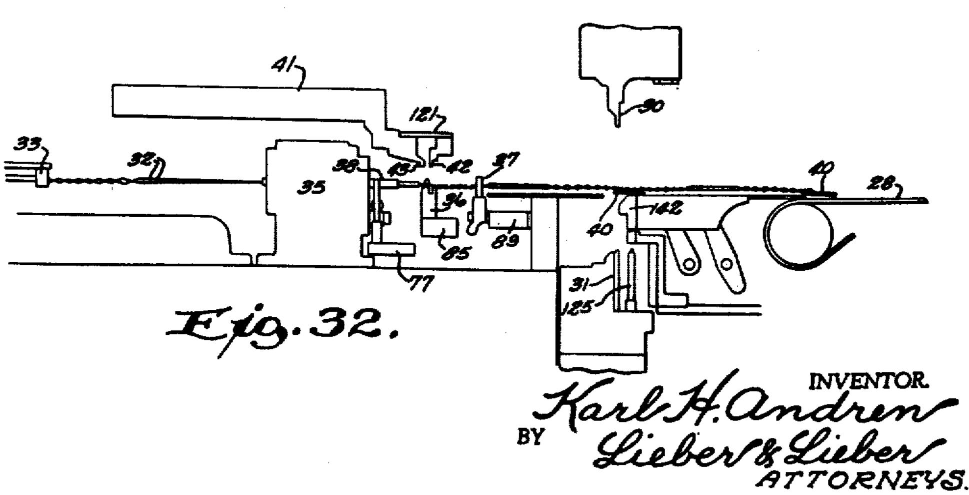

The diagram of Fig. 32 shows the relative location of the operating elements at 150° from the starting point of Fig. 6. Here the spinner fingers 38 have completed the spinning operation of the wires 32 which was started in Fig. 30, the separating fingers 36 have moved upwardly between the complementary wires 32 of each pair while they were held apart by the fingers 38, and the fingers 38 are now ready to bring the complementary wires of each pair inwardly around the fingers 36. The slides 41 have moved away from the dies and are now disposed directly above the fingers 36.

Figure 33:
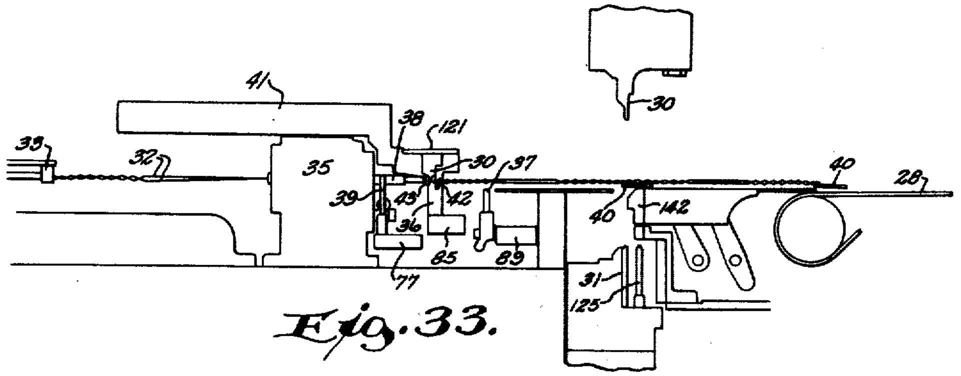

The diagram of Fig. 33 shows the relative location of the operating elements at from 190° to 198° from the starting point of Fig. 6. The slides 41 have now descended and the fingers 42, 43 of each set have clamped the adjacent pair of wires 32, straddling the section of the wires which are to be crimped into the terminal sockets of the next terminal cards 40. The wire clamp 37 has been shifted downwardly to clear the forward path of travel of the slide 41 and fingers 42, 43, and the separating fingers 36 are ready to move downwardly for the same reason.

Figure 34:
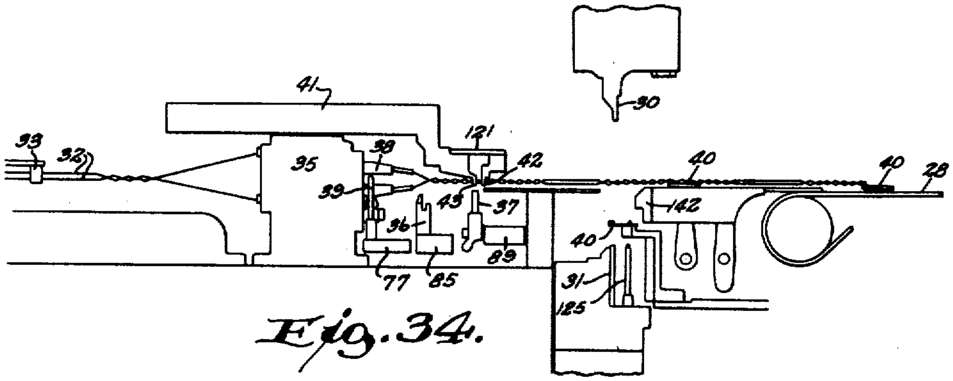

The diagram of Fig. 34 shows the relative location of the operating elements at 290 from the starting point of Fig. 6. The separating fingers 36 have been moved downwardly, and the slides 41 and fingers 42, 43 have advanced part way toward the dies, and the spinner fingers 38 are acting to spin the wires 32 during the first part of this advancement of the slides 41. The card stripper 142 has moved away from the dies sufficiently to clear the indexing mechanism of the card supply table 27, and this supply table is indexing and bringing another card 40 into position directly over the lower die 31.

Figure 35:
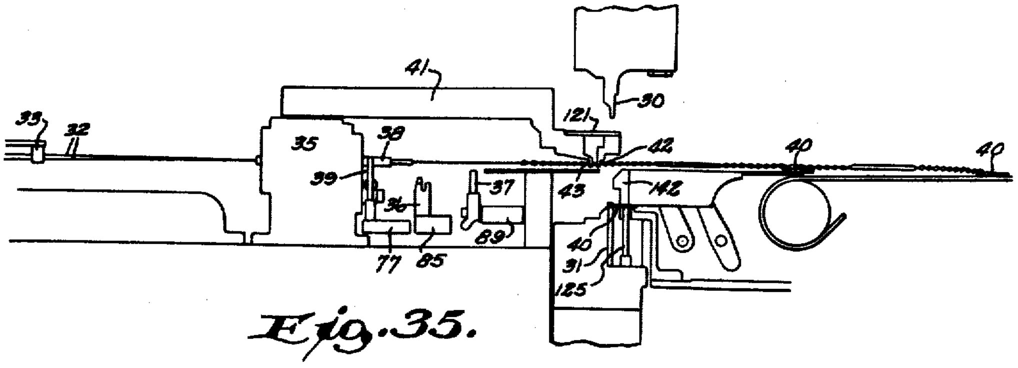

The diagram of Fig. 35 shows the relative location of the operating elements at 340° from the starting point in Fig. 6. In this final diagram the indexing operation of the card supply table 27 has been completed, and the stripper 142 has moved inwardly over the card 40 to hold the same down, while the punch 30 and die 31 have moved partially toward each other thereby causing the positioning dowels 125 to be pressed into the positioning holes 126 of the card 40 which is about to be attached to the wires 32. The spinning of the advancing wires has been completed and the slide 41 is approaching its final position under the punch 30.

Following the operation illustrated in Fig. 35, the operation of Fig. 29 is again performed and the several steps depicted in the diagrams are thereafter automatically repeated to produce the successive cycles of operation disclosed in the diagram of Fig. 6. When the successive cards 40 are attached to the longitudinally advancing wires 32, they are delivered over the final conveyor 28, and the wires 32 may be subsequently severed into suitable lengths having the desired number of cards 40 associated therewith.

It will thus be noted that the successive cards 40 are rapidly and effectively attached to the several pairs of wires 32 with each wire firmly secured to the corresponding terminals of the successive cards 40, and the punches 30 and dies 31 are so formed that they will clamp the terminals 119 to the insulated wires and will drive the small teeth of the terminals shown in Fig. 26, through the insulation so as to produce effective electrical connections. While the wires are attached to the cards 40 radially, the adjacent wires of the final assemblages are disposed approximately parallel to each other and the corresponding terminals of the successive cards 40 are effectively connected in series with each other. When a number of the card and wire assemblages have been produced and the wires have been cut into suitable lengths, the corresponding cards of the several assemblages may be grouped into stacks with two or more cards in each stack, and the several stacks may be disposed laterally adjacent to each other and may be caused to cooperate with the brushes in the usual manner. The final systems will then have a plurality of stacks disposed laterally adjacent to each other, and the corresponding terminals of the successive stacks will be connected in series by the wires 32 and each zone of attachment of the same pairs of wires will have the complementary wires 32 of each pair spun about each other on opposite sides of the point of attachment, thus producing an ideal system devoid of faulty connections and of undesirable electrical disturbances.

The spinning of the pairs of wires on opposite sides of the point of attachment to the terminals is primarily accomplished by movements of the rack 94' which in one cycle of the machine, that is, a cycle which effects the clinching of a set of terminals to a set of wires, moves either to the right or to the left, as viewed in Fig. 9 and on the succeeding cycle of the machine will move in the opposite direction, that is, either the left or the right. When the apparatus is started, four twists are made in each set of wires between the supply reels 26 and a spinning rotor 34 before the wires are passed through the spinner fingers 38. This twist is in such a direction that when the rack 94' moves from its original location in one direction, it will untwist those four twists, stop momentarily while the wires are drawn part-way forward toward the terminals, and then the rack 94' will continue to move in the same direction to the end of its travel to make four twists in the wires between the rotors 34 and the supply reels 26. The clinching operation will then take place. The feed fingers 42 and 43 will be retracted, and the rack 94' will be moved half way to its ultimate position. This movement of the rack 94' will untwist the four twists just put into the wires between the spinner fingers 38 and the supply reels, and after hesitating for a short time the rack 94' will continue its movement back to its original position to put four twists into the wires between the spinner fingers 38 and the supply reels. Thus, in the operation of the machine the wires are twisted between the previously attached terminal and the spinner fingers 38 eight times in one direction, this twisting being effected in two steps and the twists being applied between the clinched terminals and the spinner fingers 38. Thus, in a complete cycle of the apparatus the spinning rotors 34 in spinning four times twist the incoming wires four times between the supply reels and the spinner fingers 38 and then when rotating in the opposite direction the spinning rotors 34 turn eight times to take out the four twists originally put in, and put in four twists in the opposite direction.

From the foregoing detailed description it will be apparent that my present invention provides a simple but highly effective method of attaching layers of terminals or the like to successive portions of a plurality of elongated elements such as wires or the like, and of twisting complementary pairs of the wires on opposite sides of the zones of attachment. The invention furthermore provides simple, highly efficient and durable mechanism for effecting commercial exploitation of the improved method in an automatic and dependable manner. The improved method and apparatus have proven very satisfactory and successful in actual commercial use, especially as applied to the attachment of telephone terminal cards to insulated wires, and while the apparatus may appear quite complex in view of the relatively delicate and compact construction of the terminal cards and wires which are handled in connection with such work, the improved apparatus has nevertheless vastly reduced the amount of labor involved in producing such telephone equipment. Because of the rather complicated nature of the machine, it has been deemed desirable to show some parts thereof rather diagrammatically in order to clarify the disclosure, but it will be apparent, from the chart of Fig. 6 and from the diagrams of Figs. 29 to 35, inclusive, that the improved machine is adapted to methodically and effectively perform the several steps of the method expeditiously and in a minimum period of time.

It should be understood that it is not desired to limit this invention to the exact steps of the method, or to the precise construction of the apparatus, herein shown and described, for various modifications within the scope of the claims may occur to persons skilled in the art.

What is claimed is:

1. In a mechanism for attaching terminals to wires, means for intermittently advancing a plurality of pairs of wires longitudinally in definite paths toward a common zone, means for successively twisting short lengths of each pair of wires about each other as they approach said zone to provide spaced twists along said wires, means for spacing the lengths of wires intermediate said twists in predetermined positions whereby each wire occupies the same position after each successive advance, means for successively positioning a performed group of terminals adjacent the wires in said zone, means for attaching each terminal of the group to its adjacent wire, and means for coordinating the movement of the aforementioned means for successive operation.

2. In a mechanism for attaching terminals to wires, means for intermittently advancing a plurality of wires longitudinally toward a common zone, means for successively twisting relatively short lengths of adjacent pairs of said wires about each other as they approach said zone to provide spaced twists along the wires, means for spreading and separating the wires of each pair between successive twists, means for successively positioning preformed groups of terminals adjacent to the separated portions of the wires at said zone, means for attaching each terminal of the group to its adjacent wire, and means of coordinating the movement of all of said means for successive operation.

3. In a mechanism for attaching terminals to wires, means for intermittently advancing a plurality of pairs of wires longitudinally in definite paths toward a common zone, means for successively twisting short lengths of each pair of wires about each other as they approach said zone to provide spaced twists along said wires, means for spacing the lengths of wires intermediate said twists in predetermined positions whereby each wire occupies the same position after each successive advance, means for intermittently positioning successive preformed arcuate groups of terminals adjacent the spaced portions of the wires in said zone, means for attaching each terminal of each group to its adjacent wire so as to provide electrical connections, and means for coordinating the movements of all of said means for successive operation.

4. In a mechanism for attaching terminals to wires, means for intermittently advancing a plurality of wires longitudinally toward a common zone, means for successively twisting relatively short lengths of adjacent pairs of said wires about each other as they approach said zone to provide spaced twists along the wires, means for spreading and separating the wires of each pair between successive twists, means for intermittently positioning successive preformed arcuate groups of terminals adjacent to the separated portions of the wires at said zone, means for attaching each terminal of each group to its adjacent wire between successive twists, and means for coordinating the movements of all of said means for successive operations.

5. In a mechanism for attaching terminals to wires, means for longitudinally advancing a plurality of wires toward a common zone, means for twisting relatively short lengths of adjacent pairs of said wires about each other as they approach said zone to provide successive twists spaced along the wires, means for spreading and separating laterally adjacent portions of the wires of each pair between successive twists, means for successively postioning a preformed group of terminals adjacent said spread portions of said pairs while at said zone, means for attaching each terminal of the group to its adjacent wire portion, and means for coordinating the movements of all of said means for successive operations.

6. An apparatus for attaching wires at longitudinally spaced points to the terminals on successive insulator cards comprising means for attaching a plurality of wires to spaced terminals on a card, means for intertwisting pairs of said wires in a zone following the attachment of the wires to the terminals of a card, means for spacing the wires at points where terminals are to be attached following a twisted zone, and means for grasping the wires at the spaced points and advancing them to the attaching means for attachment to the next card.

7. An apparatus for attaching wires at longitudinally spaced points to the terminals on successive insulator cards comprising means for attaching a plurality of wires to spaced terminals on a card, twisting means for intertwisting said wires in pairs after being attached to the terminals of a card, means for operating said twisting means in one direction after the wires are attached to one card and in the opposite direction after being attached to the next card, and means for grasping the wires at points following twisted portions to advance the wires for attachment to the terminals of the next card.

8. An apparatus for attaching wires at longitudinally spaced points to spaced terminals on successive insulator cards comprising means for attaching the wires to the spaced terminals of an insulator card, means for supporting an insulator card in position adjacent the attaching means, means for intermittently advancing continuous lengths of wires to the attaching means comprising a vertically and horizontally reciprocable member having means for grasping the individual wires and advancing spaced points on them to the attaching means, and means for actuating said advancing means in timed relation to said attaching means whereby terminals are attached at spaced points to each wire.

9. An apparatus for attaching wires at longitudinally spaced points to the terminals on successive insulator cards comprising means for attaching the wires to the spaced terminals of an insulator card, means for supporting an insulator card in position adjacent the attaching means, means for intertwisting pairs of wires after each attachment of the wires to terminals, means for holding the wires in spaced relation following a twist, advancing means for intermittently advancing the wires to the attaching means comprising a vertically and horizontally reciprocable member provided with grasping means for grasping the wires in the holding means and advancing them to the attaching means, and means for actuating said advancing means in timed relation to the twisting and attaching means.

10. An apparatus for attaching continuous lengths of wires to a plurality of series of terminals mounted on insulators comprising a support for an insulator, means cooperating with said support for positioning intermediate points above said continuous lengths of said wires adjacent the terminals on said insulator, a punch and die for attaching the terminals to the wires, and means to advance the wires longitudinally toward said support for attaching another plurality of terminals thereto.

11. An apparatus for attaching wires at longitudinally spaced points to the terminals on successive insulator cards comprising an intermittently rotatable support for said cards, a vertically movable support for said cards, transfer means for transferring said cards from said rotatable support to said vertically movable support, means cooperable with said vertically movable support for juxtapositioning said wires and terminals, and means for effecting attachment between said wires and terminals.

12. An apparatus for attaching wires at longitudinally spaced points to the terminals on successive insulator cards comprising an intermittently rotatable support for said cards, a vertically movable support for said cards, transfer means for transferring said cards from said rotatable support to said vertically movable support, means cooperable with said vertically movable support for juxtapositioning said wires and terminals, a punch and die for attaching said wires to said terminals, and means for operating said punch and said die to effect said attachment.

13. An apparatus for attaching wires at longitudinally spaced points to the terminals on successive insulator cards comprising an intermittently rotatable support for said cards, a vertically movable support for said cards, transfer means for transferring said cards from said rotatable support to said vertically movable support, means cooperable with said vertically movable support for juxtapositioning said wires and terminals, a punch and die for attaching said wires to said terminals, means for operating said punch and said die to effect said attachment, and a conveyor above and extending across said rotatable card support for moving said wires and attached insulator card from said attaching means.

14. An apparatus for attaching wires at longitudinally spaced points to the terminals on successive insulator cards comprising means for attaching a plurality of wires to spaced terminals on a card, a plurality of twisting heads for intertwisting pairs of wires disposed in arcuate alignment a predetermined distance from said attaching means, means for advancing said wires from said twisting means in radial paths toward said attaching means, said advancing means comprising radially, reciprocably movable slides having fingers for grasping the wires adjacent the twisting means and moving them toward said attaching means, and means for operating said attaching, twisting and advancing means in timed relation.

15. An apparatus for attaching wires at longitudinally spaced points to the terminals on successive insulator cards comprising a table for holding a card with terminals fixed thereto in position to receive wires fed to said terminals, a guide for receiving said wires and cards after the wires have been attached to the terminals, clinching tools comprising attaching punches and dies for clinching the terminals to the wires, a plurality of wire guiding fingers, a plurality of rotors, each supporting two wire guiding fingers, means for directing each wire to a wire guiding finger, means for advancing wires from said fingers toward the clinching tools and from the clinching tools to the guide for receiving the wires and cards, said advancing means comprising radially reciprocably movable slides having fingers for gripping the wires adjacent the rotors and moving them toward the clinching tools, and means for operating said clinching tools, rotors and advancing means intermittently and in timed relation one to another.

16. An apparatus for attaching wires at longitudinally spaced points to the terminals on successive insulator cards comprising an indexible table for holding a card with terminals fixed thereto in position to receive wires fed to said terminals, a guide extending across said table for receiving said wires and cards after the wires have been attached to the terminals, clinching tools comprising reciprocable punches and dies operable in timed relation to the indexing of the table for clinching the terminals to the wires, a plurality of twisting heads for inter-twisting pairs of wires disposed in arcuate alignment a predetermined distance from said table, means for advancing said wires from the twisting heads to the attaching punches and dies, said advancing means comprising reciprocably movable slides having feed fingers thereon for gripping the wires adjacent the twisting heads and moving them toward the punches and dies, and means for operating the table, punches and dies, twisting heads and advancing means in timed relation.

17. An apparatus for attaching wires at longitudinally spaced points to the terminals on successive insulator cards comprising an indexible table for holding cards with terminals fixed thereto in a position where the terminals extend beyond an edge of the table, clinching tools comprising attaching punches and dies reciprocable adjacent said edge of the table to engage the terminals and clinch them into electrical contacting engagement with the wires, a plurality of twisting heads for intertwisting pairs of wires disposed in an arcuate path having the same axis as the indexible table and being spaced a predetermined distance from said edge of said table, means for advancing wires from said twisting heads in radial paths towards the punches and dies, said advancing means comprising slides having gripping fingers for gripping the wires adjacent the twisting heads and moving them towards the punches and dies, and means for operating the punches and dies, table, twisting heads and advancing means in timed relation.

18. An apparatus for attaching wires at longitudinally spaced points to the terminals on successive insulator cards comprising a framework, an indexible table mounted for intermittent rotary motion on said framework, means on said table for holding an insulating card with metallic terminal elements thereon in position to extend outwardly beyond an edge of the table in position to receive wires fed thereto, clinching tools comprising attaching punches and dies for clinching the terminals to the wires, a plurality of wire guiding elements for receiving the wires being directed to the terminals, a plurality of rotors, each supporting two of said wire guiding elements, means for directing a wire to each of said elements, reciprocatory feeding members for gripping said wires and drawing them through the rotor supported guiding elements, means for rotating said rotors during the movement of said feeding members, means for indexing said table one step to feed a new card to position to be attached to the wires intermittent the movements of the feeding members, and means for operating the punches and dies during the retraction of the feeding members after the feeding members have fed the wires.

KARL H. ANDREN.

REFERENCES CITED

The following references are of record in the file of this patent:

UNITED STATES PATENTS

| Number | Name | Date |
|---|---|---|
| 1,287,100 | Reynolds | Dec. 10, 1918 |
| 1,298,330 | Goodrum | Mar. 25, 1919 |
| 1,334,276 | Adams | Mar. 23, 1920 |
| 1,743,364 | Liss | Jan. 14, 1930 |
| 1,971,481 | Erickson | Aug. 28, 1934 |
| 2,040,330 | Pagenkopf | May 15, 1936 |
| 2,182,968 | Lunsford | Dec. 12, 1939 |
| 2,340,360 | Alden | Feb. 1, 1944 |
| 2,340,448 | Andren | Feb. 1, 1944 |
| 2,343,466 | Malhiot | Mar. 7, 1944 |

FOREIGN PATENTS

| Number | Country | Date |
|---|---|---|
| 228,825 | Great Britain | Feb. 5, 1925 |